United States Patent
Kim et al.

(10) Patent No.: US 9,575,379 B2
(45) Date of Patent: Feb. 21, 2017

(54) LIQUID CRYSTAL DISPLAY AND MANUFACTURING METHOD THEREOF

(71) Applicant: Samsung Display Co., Ltd., Yongin, Gyeonggi-Do (KR)

(72) Inventors: Hyo Sik Kim, Yongin-si (KR); Byung-Gon Kum, Suwon-si (KR); Min-Joo Han, Seoul (KR); Ji Phyo Hong, Pyeongtaek-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/612,146

(22) Filed: Feb. 2, 2015

(65) Prior Publication Data

US 2016/0011470 A1  Jan. 14, 2016

(30) Foreign Application Priority Data

Jul. 10, 2014  (KR) .................. 10-2014-0086976

(51) Int. Cl.
 *C09K 19/00* (2006.01)
 *G02F 1/1343* (2006.01)
 *G02F 1/1337* (2006.01)

(52) U.S. Cl.
 CPC ..... *G02F 1/13439* (2013.01); *G02F 1/133707* (2013.01); *G02F 2001/134345* (2013.01); *G02F 2201/40* (2013.01); *Y10T 428/10* (2015.01); *Y10T 428/1059* (2015.01); *Y10T 428/1064* (2015.01)

(58) Field of Classification Search
 CPC .............. G02F 1/134309; G02F 1/1337; G02F 1/13439; G02F 1/1368; G02F 1/136277; G02F 2001/134345; G02F 2201/40; H01L 29/4908; H01L 29/51; Y10T 428/1059; Y10T 428/1064; Y10T 428/1068
 USPC ....... 428/1.1, 1.5, 1.51, 1.52, 1.62; 349/43, 349/122, 138, 141, 144; 438/25; 257/59, 257/72
 See application file for complete search history.

(56) References Cited

U.S. PATENT DOCUMENTS

| | | | |
|---|---|---|---|
| 5,926,240 A | 7/1999 | Hirota et al. | |
| 8,427,610 B2 | 4/2013 | Ueda et al. | |
| 8,432,344 B2 | 4/2013 | Yeom et al. | |
| 2011/0222007 A1* | 9/2011 | Ueda ................ | C09K 19/02 349/124 |
| 2013/0083264 A1 | 4/2013 | Hagiwara et al. | |

FOREIGN PATENT DOCUMENTS

| | | |
|---|---|---|
| EP | 0182484 A2 | 5/1986 |
| JP | 3522845 B2 | 2/2004 |
| JP | 2007-241316 A | 9/2007 |
| KR | 10-2004-0056970 A | 7/2004 |

OTHER PUBLICATIONS

Mackel et al., Detailed study of the composition of hydrogenated SiN x layers for high-quality silicon surface passivation, Journal of Applied Physics, vol. 92, p. 2602 (2002).

* cited by examiner

*Primary Examiner* — Ruiyun Zhang
(74) *Attorney, Agent, or Firm* — Innovation Counsel LLP

(57) ABSTRACT

Disclosed is a liquid crystal display. According to an exemplary embodiment, a liquid crystal display includes: a first substrate; a first electrode disposed on the first substrate; a second substrate facing the first substrate; a second electrode disposed on the second substrate and facing the first electrode; a liquid crystal layer disposed between the first substrate and the second substrate; and a first silicon nitride film formed between the liquid crystal layer and at least one of the first electrode and the second electrode, wherein a first region in which the first silicon nitride film is disposed between either of the first electrode and the second electrode and the liquid crystal layer and a second region in which the first silicon nitride film is not disposed between the first electrode and the liquid crystal layer and between the second electrode and the liquid crystal layer are formed, and a first electric field generated between the first and second electrodes in the first region is different from a second electric field generated between the first and second electrodes in the second region.

20 Claims, 9 Drawing Sheets

FIG. 5

|  | Comparative Example 1 | Comparative Example 2 | Embodiment |
|---|---|---|---|
| Transmittance | 100.0% | 95.0% | 96.4% |
| GDI | 0.394 | 0.310 | 0.283 |

LIQUID CRYSTAL DISPLAY AND MANUFACTURING METHOD THEREOF

CROSS-REFERENCE TO RELATED APPLICATION

This application claims priority to and the benefit of Korean Patent Application No. 10-2014-0086976 filed in the Korean Intellectual Property Office on Jul. 10, 2014, the entire contents of which are incorporated herein by reference.

BACKGROUND (a) Field

The embodiments relates to a liquid crystal display and a manufacturing method thereof.

(b) Description of the Related Art

A liquid crystal display is widely used in flat-panel displays and generally includes two display panels on which electric field generating electrodes, such as a pixel electrode and a common electrode, are formed. In addition, a liquid crystal layer is inserted between the two display panels.

A liquid crystal display generally displays an image by generating electric fields in the liquid crystal layer at the pixel level by applying voltages to the electric field generating electrodes. The electric fields generated determine the alignments of the liquid crystal molecules in the liquid crystal layer, and as a result, determine the polarization of the incident light on the liquid crystal layer. By controlling the strength of the electric fields and varying the polarization of incident light at the pixel level, a liquid crystal display device is able to display an image.

A liquid crystal display generally further includes switching elements that are connected to each of the pixel electrodes and a plurality of signal lines, such as gate lines and data lines, for controlling the state of the switching elements. The state in which a switching element is in determines whether a voltage is applied to a pixel electrode.

A liquid crystal display with a vertically aligned mode generally has a high contrast ratio and provides a wide reference angle. The vertically aligned mode refers to the state in which the long axes of the liquid crystal molecules are arranged perpendicular to the planar surface of the display panels when no electric field is applied.

A liquid crystal display with the vertically aligned mode may have degraded side visibility compared to its frontal visibility. To solve the problem, a method of dividing one pixel into two subpixels and making the voltages of the two subpixels different so that the two subpixels have different transmittance has been proposed. However, because this method adds a thin-film transistor and a capacitor to divide the voltage of the subpixel, an aperture ratio is deteriorated.

SUMMARY

The embodiments provide a liquid crystal display that realizes a multi-division visibility configuration without reduction of an aperture ratio, and a manufacturing method thereof.

An embodiment provides a liquid crystal display including: a first substrate; a first electrode disposed on the first substrate; a second substrate facing the first substrate; a second electrode disposed on the second substrate and facing the first electrode; a liquid crystal layer disposed between the first substrate and the second substrate; and a first silicon nitride film disposed between the liquid crystal layer and at least one of the first electrode and the second electrode, wherein a first region in which the first silicon nitride film is disposed between either of the first electrode and the second electrode and the liquid crystal layer and a second region in which the first silicon nitride film is not disposed between the first electrode and the liquid crystal layer and between the second electrode and the liquid crystal layer are formed, and a first electric field generated between the first and second electrodes in the first region is different from a second electric field generated between the first and second electrodes in the second region.

The first region and the second region may be included in a pixel.

The first silicon nitride film may include positive charges.

The first silicon nitride film may include positive charges expressed in the following Formula 1.

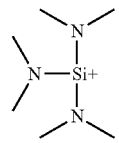

Formula 1

The liquid crystal display may further include a thin-film transistor disposed on the first substrate, wherein the thin-film transistor is connected to the first electrode, the first electrode includes a first subpixel electrode corresponding to the first region and a second subpixel electrode corresponding to the second region, and the first subpixel electrode and the second subpixel electrode receive a voltage from the thin-film transistor.

The liquid crystal display may further include an alignment layer disposed between the first silicon nitride film and the liquid crystal layer in the first region, and disposed between at least one of the first electrode and the second electrode and the liquid crystal layer in the second region.

The first silicon nitride film may be formed between the first electrode and the liquid crystal layer, and a second silicon nitride film may be formed in a third region of the liquid crystal display and between the second electrode and the liquid crystal layer.

The second region may be disposed between the first region and the third region.

The first region, the second region, and the third region may be included in a pixel.

The liquid crystal display further may include a thin-film transistor disposed on the first substrate, wherein the thin-film transistor is connected to the first electrode, the first electrode includes a first subpixel electrode corresponding to the first region, a second subpixel electrode corresponding to the second region, and a third subpixel electrode corresponding to the third region, and the first subpixel electrode, the second subpixel electrode, and the third subpixel electrode receive a voltage from the thin-film transistor.

The liquid crystal display may further include an alignment layer disposed between the first silicon nitride film and the liquid crystal layer in the first region, disposed between the second silicon nitride film and the liquid crystal layer in the third region, and disposed between at least one of the first electrode and the second electrode and the liquid crystal layer in the second region.

Another embodiment provides a method for manufacturing a liquid crystal display, including: forming a first electrode on a first substrate; forming a second electrode on a second substrate facing the first substrate; forming a first silicon nitride film on at least one of the first electrode or the second electrode; and forming a liquid crystal layer between the first substrate and the second substrate, wherein a first region in which the first silicon nitride film is disposed between either of the first electrode and the second electrode and the liquid crystal layer and a second region in which the first silicon nitride film is not disposed between the first electrode and the liquid crystal layer and between the second electrode and the liquid crystal layer are formed, and a first electric field generated between the first and second electrodes in the first region is different from a second electric field generated between the first and second electrodes in the second region.

The first silicon nitride film may be formed at the temperature equal to or less than of 450 degrees Celsius by using a chemical vapor deposition method.

The first silicon nitride film may be formed to include positive charges.

The first silicon nitride film may be formed to include positive charges expressed in the following Formula 1.

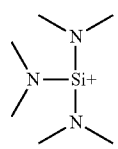

Formula 1

The method may further include forming an alignment layer between the first silicon nitride film and the liquid crystal layer in the first region, and between at least one of the first electrode and the second electrode and the liquid crystal layer in the second region.

The first silicon nitride film may be formed between the first electrode and the liquid crystal layer, a second silicon nitride film may formed in a third region of the liquid crystal display and between the second electrode and the liquid crystal layer, and the second region may be formed to be disposed between the first region and the third region.

The first region, the second region, and the third region may be formed to be included in a pixel.

The method may further include forming a thin-film transistor on the first substrate, wherein the thin-film transistor is connected to the first electrode, the first electrode includes a first subpixel electrode corresponding to the first region, a second subpixel electrode corresponding to the second region, and a third subpixel electrode corresponding to the third region, and the first subpixel electrode, the second subpixel electrode, and the third subpixel electrode receive a voltage from the thin-film transistor.

According to inventive concept, to divide the voltage of a pixel electrode among a plurality of subpixel electrodes, a silicon nitride film including positive charges may be formed on a portion of the pixel area of the pixel electrode, thereby realizing a multi-division visibility configuration and reducing the aperture ratio.

BRIEF DESCRIPTION OF THE DRAWINGS

FIG. 5 shows a numerical table of exemplary transmittance and visibility values for the comparative examples and the embodiment shown in FIG. 4.

DETAILED DESCRIPTION OF THE EMBODIMENTS

Figure 1:
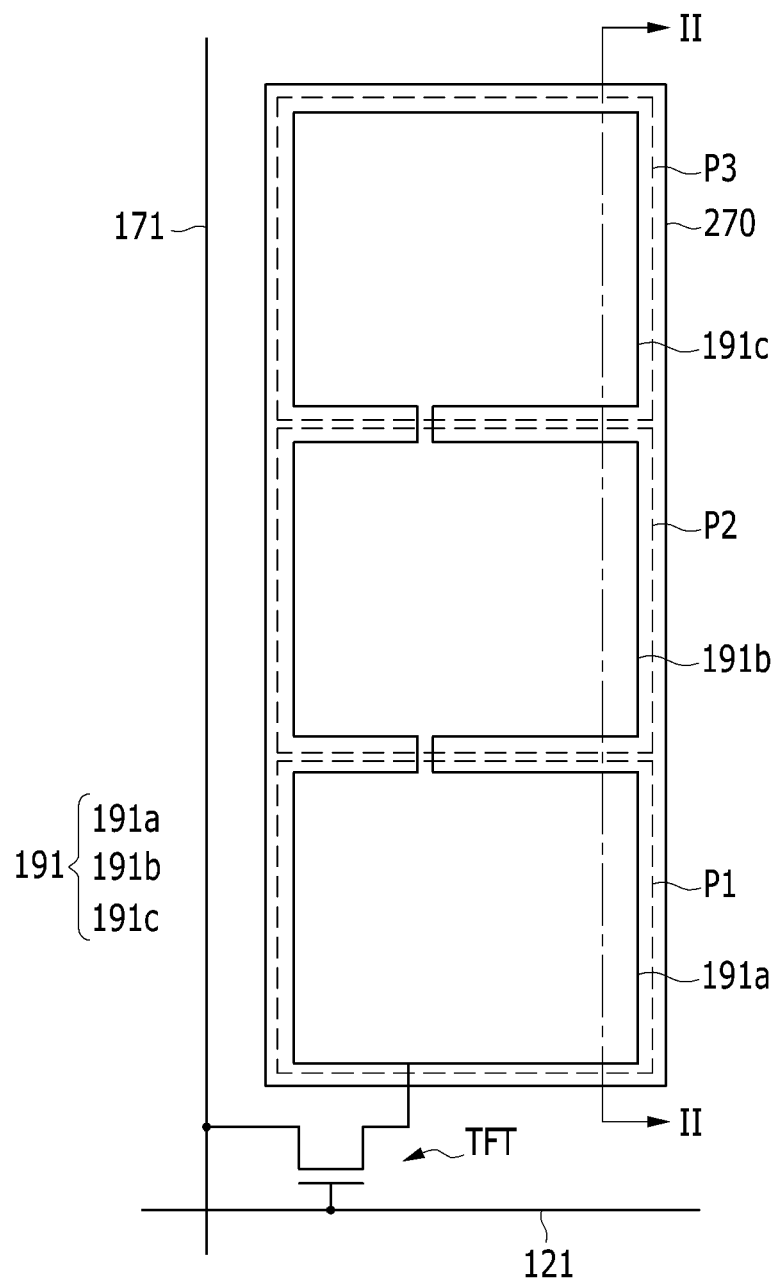
FIG. 1 shows a layout view of a liquid crystal display according to an embodiment.

Embodiments are described more fully hereinafter with reference to the accompanying drawings in which exemplary embodiments of the inventive concepts are shown. However, it is understood that the inventive concepts is not limited to the disclosed embodiments. On the contrary, those of ordinary skill in the art would realize that the described embodiments may be modified in various different ways, all without departing from the spirit and scope of the inventive concepts.

In the drawings, the thickness of layers, films, panels, regions, etc., are exaggerated for clarity. It is understood that when an element such as a layer, film, region, or substrate is referred to as being "on" another element, it may be directly on the other element or intervening elements may also be present. In contrast, when an element is referred to as being "directly on," "directly connected to" or "directly coupled to" another element or layer, there are no intervening elements or layers present. Like reference numerals designate like elements throughout the specification.

Figure 2:
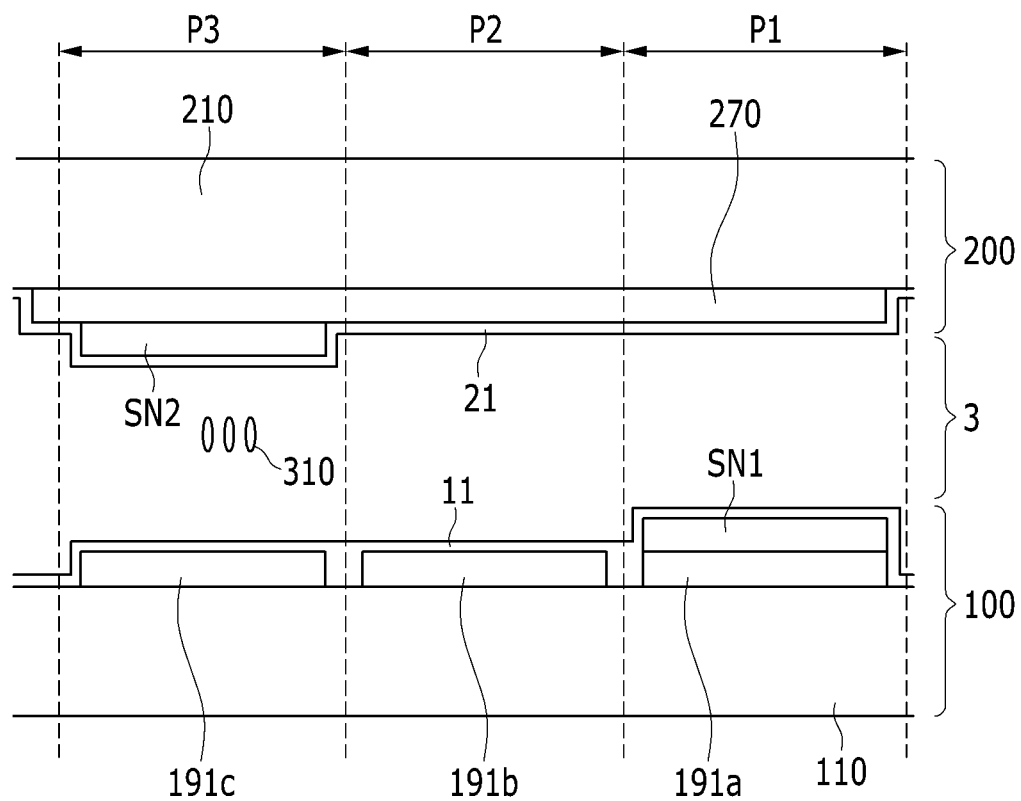
FIG. 2 shows a cross-sectional view with respect to a line II-II of FIG. 1.

FIG. 1 shows a layout view of a liquid crystal display according to an embodiment. FIG. 2 shows a cross-sectional view with respect to a line II-II of FIG. 1.

Referring to FIG. 1 and FIG. 2, the liquid crystal display includes a lower panel 100, an upper panel 200, and a liquid crystal layer 3 that is disposed between the display panels 100 and 200 and includes liquid crystal molecules 310.

FIG. 1 shows a pixel area from among a plurality of pixel areas disposed in a row direction and a column direction of the liquid crystal display. A thin-film transistor (TFT) is disposed in the pixel area and connected to a gate line 121, a data line 171, and a pixel electrode 191. The pixel electrode 191 is divided into a plurality of regions (in the case of FIG. 1, three regions).

Referring to FIG. 1 and FIG. 2, a pixel electrode 191 is disposed on a first substrate 110, and a common electrode 270 is disposed on a second substrate 210 facing the first substrate 110. The pixel area shown in FIG. 1 and FIG. 2 includes a first region P1, a second region P2, and a third region P3. The pixel electrode 191 includes a first subpixel electrode 191a disposed in the first region P1, a second subpixel electrode 191b disposed in the second region P2, and a third subpixel electrode 191c disposed in the third region P3.

A first silicon nitride film SN1 is disposed on the pixel electrode 191, and a second silicon nitride film SN2 is disposed on the common electrode 270. Particularly, the first silicon nitride film SN1 is disposed between the first subpixel electrode 191a and the liquid crystal layer 3, and the second silicon nitride film SN2 is disposed between the third subpixel electrode 191c and the liquid crystal layer 3. The silicon nitride film is not formed in the second region P2.

A first alignment layer 11 is disposed on the pixel electrode 191. A second alignment layer 21 is disposed on the common electrode 270. The first silicon nitride film SN1 is formed between the first subpixel electrode 191a and the first alignment layer 11 in the first region P1. The second silicon nitride film SN2 is formed between the common electrode 270 and the second alignment layer SN2 in the third region P3.

According to embodiments of the inventive concepts, the silicon nitride films SN1 and SN2 are formed at a temperature equal to or less than 450 degrees Celsius by using a chemical vapor deposition method. In this manner, positive charges, as expressed in Formula 1 below, are generated according to Mechanism 1 (also shown below) during the forming process. Therefore, the silicon nitride films SN1 and SN2 that are formed according embodiments include the positive charges expressed in Formula 1.

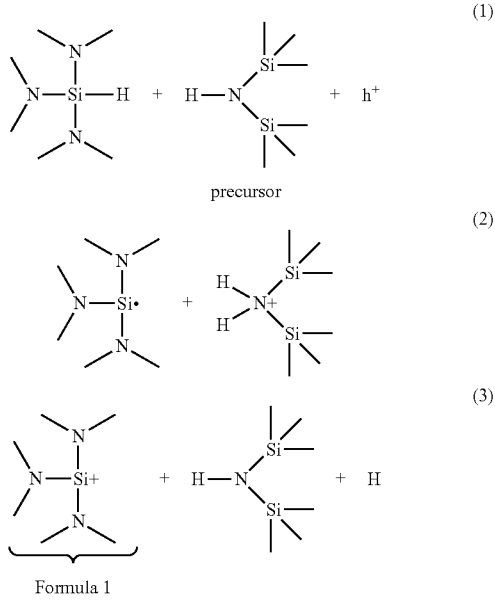

Formula 1

[Mechanism 1]

When a mixture of $SiH_4/NH_3$ or $SiH_4/H_2/N_2$ gas is deposited by using a low-temperature plasma enhanced chemical vapor deposition (PECVD) method, $Si_3N_4$ is not generated. Instead, a thin film of SiNx including about 8 to 30 at % of hydrogen is formed. However, because the reducing speed of the combination of Si and Si is slower than the increasing speed of the combination of Si and N in this process, $H-N-(SiH_3)_2$ functions as a precursor, as shown in Mechanism 1, to generate the positive charges of Formula 1.

When the silicon nitride film is formed between the pixel electrode 191 and the liquid crystal layer 3 or between the common electrode 270 and the liquid crystal layer 3, the total capacitance is reduced because the capacitance induced by the silicon nitride film and the liquid crystal layer 3 is connected in series with the other capacitances.

Figure 3:
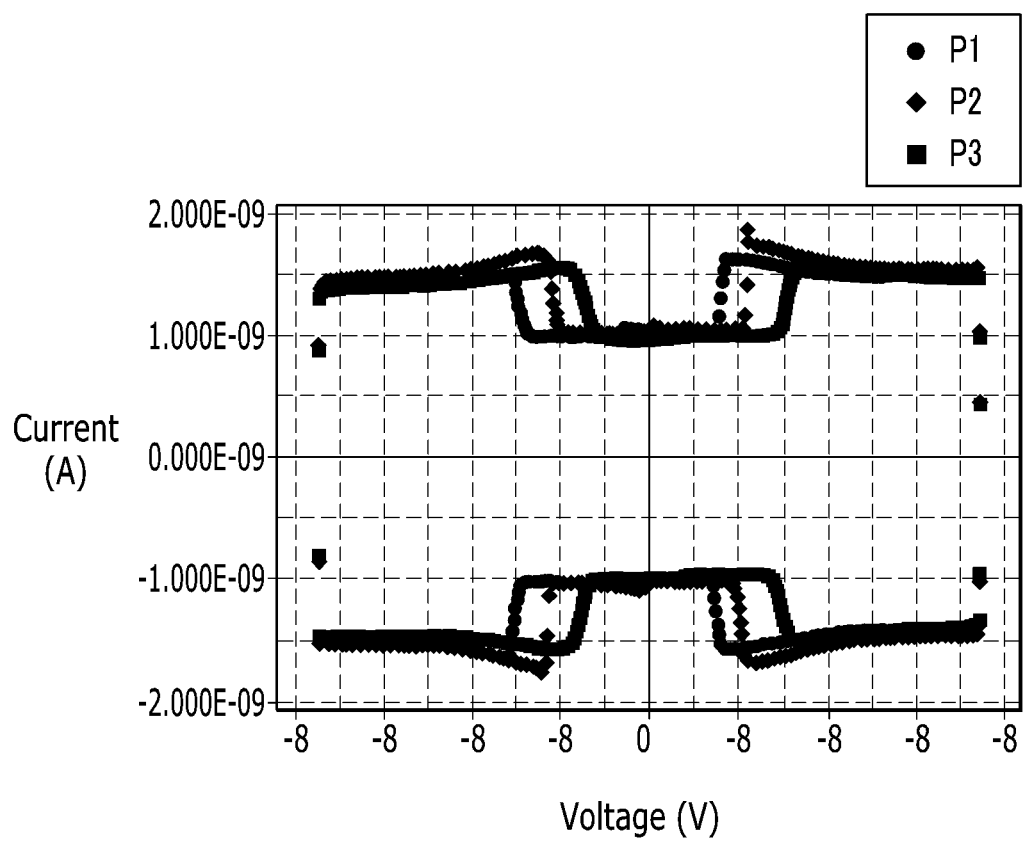
FIG. 3 shows a graph of a current-voltage curve for the respective regions shown in FIG. 1 and FIG. 2.

FIG. 3 shows a graph of a current-voltage curve for the respective regions shown in FIG. 1 and FIG. 2, according to an exemplary embodiment. Referring to FIG. 3, changes of the current-voltage curve are shown for when a voltage is applied to the pixel electrode 191 and the common electrode 270, which is grounded. With respect to the current-voltage curve of the second region P2, the current-voltage curve is shifted to the left in the first region P1 and the current-voltage curve is shifted to the right in the third region P3. These shifts correspond to changes in a threshold voltage Vth. The first region P1, second region P2, and third region P3 may correspond to a high pixel region, a middle pixel region, and a low pixel region, respectively. Thus, according to an embodiment of the inventive concept, the pixel may be divided into three pixel regions.

Figure 4:
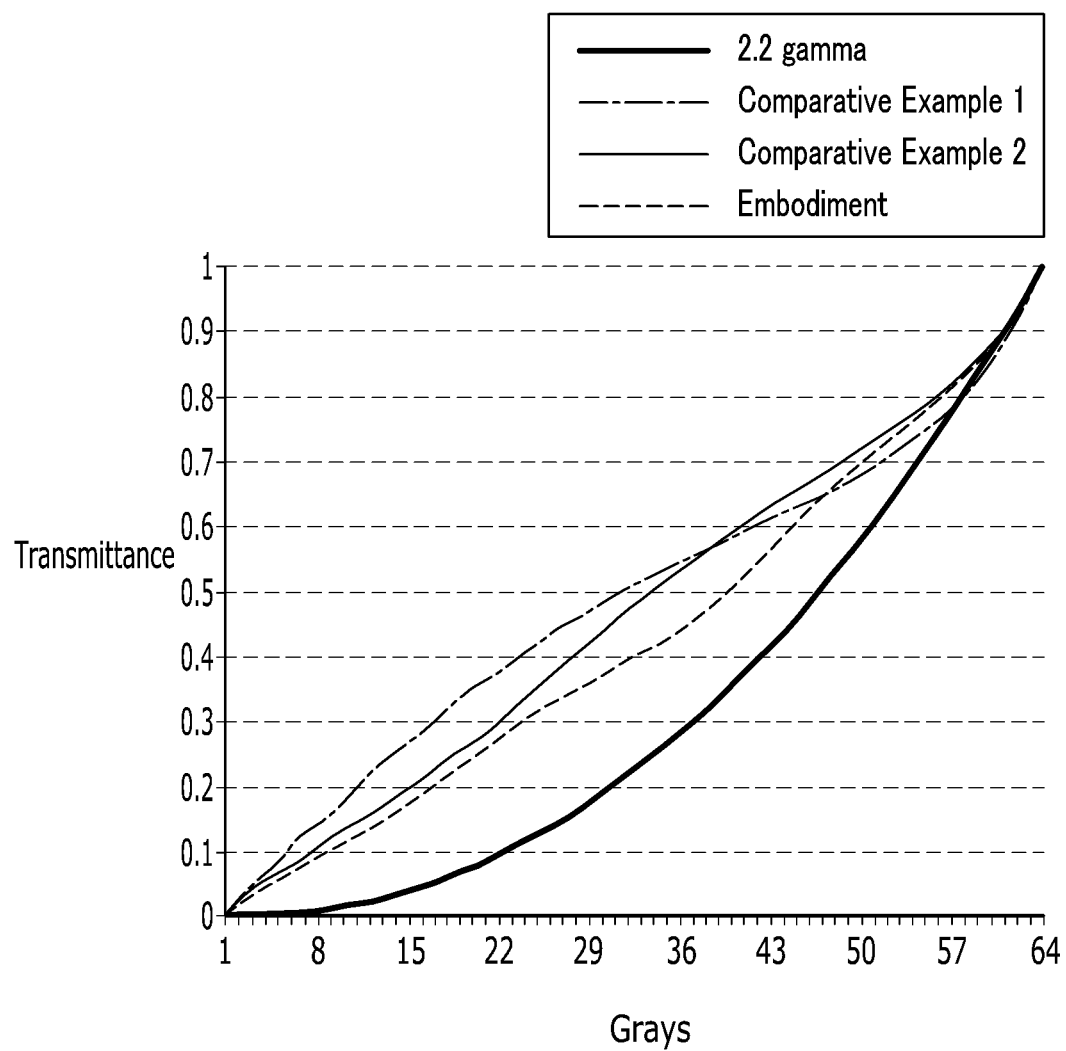
FIG. 4 shows a graph of luminance curves over a range of gray values, the luminance curves corresponding to comparative examples and an embodiment.

FIG. 4 shows a graph of luminance curves over a range of gray values, the luminance curves corresponding to comparative examples and an embodiment. Referring to FIG. 4, Comparative Example 1 shows a measurement of lateral visibility for a case in which the voltage of the pixel electrode is not differentially divided. Comparative Example 2 shows a measurement for a case in which the voltage is differentially divided to achieve an area ratio of 1:1.5 and a voltage ratio of 0.77. Comparative Example 2 may have additional thin film transistor and capacitor to improve the lateral visibility. In the exemplary embodiment shown in FIG. 4, the pixel area is divided into three regions with an area ratio of 1:1:1, and a voltage drop degree caused by the silicon nitride film is 9%. As shown in FIG. 4, the lateral visibility of the exemplary embodiment is closer in value to its frontal visibility compared to Comparative Example 1 and Comparative Example 2. In FIG. 4, 2.2 gamma may mean the frontal visibility.

FIG. 5 shows a numerical table of exemplary transmittance and visibility values for the comparative examples and the exemplary embodiment shown in FIG. 4. Referring to FIG. 5, compared to the transmittance for Comparative Example 1, which is at 100%, the transmittance for the exemplary embodiment is a little reduced, but a visibility index (GDI) is improved. In Comparative Example 2, which uses two divisions, the transmittance is additionally lowered compared to the exemplary embodiment. Therefore, when the thin-film transistor is not added to realize the differential voltage, like in the exemplary embodiment, visibility is improved and reduction of aperture ratio or transmittance is minimized.

Figure 6:
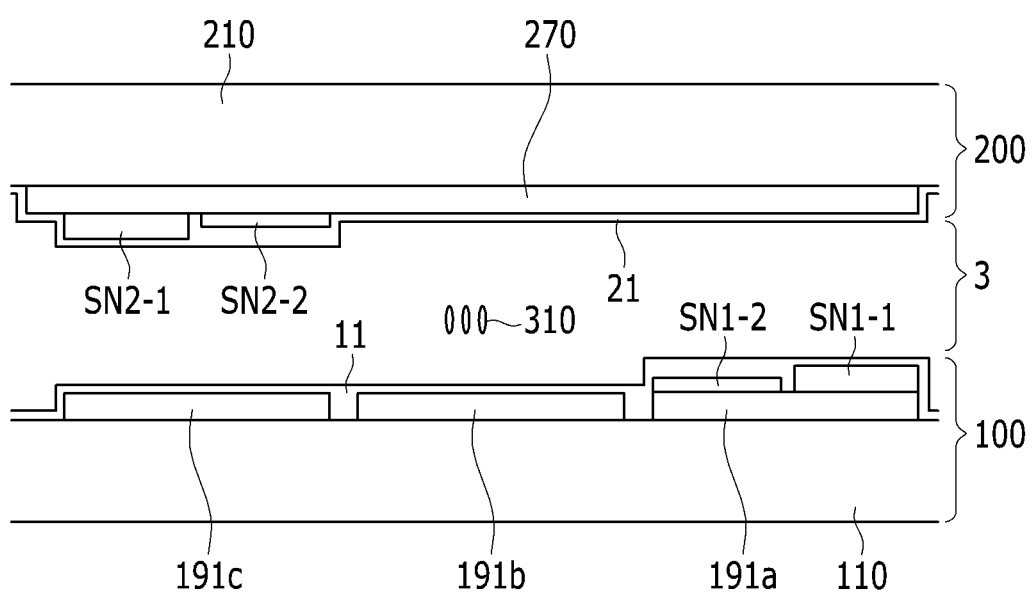
FIG. 6 shows a cross-sectional view of a pixel electrode that additionally divides an electric field forming region by having different thicknesses of a silicon nitride film formed thereon, according to an embodiment.

FIG. 6 shows a cross-sectional view of a pixel electrode that additionally divides an electric field forming region by having different thicknesses of a silicon nitride film formed thereon, according to an exemplary embodiment. Referring to FIG. 6, the first silicon nitride film SN1 in the first region P1 (see FIG. 2) includes a 1-1 silicon nitride film (SN1-1) and a 1-2 silicon nitride film (SN1-2). The 1-1 silicon nitride film (SN1-1) and the 1-2 silicon nitride film (SN1-2) have different thicknesses from each other. Similarly, the second silicon nitride film SN2 in the third region P3 (see FIG. 2) includes a 1-1 silicon nitride film (SN1-1) and a 1-2 silicon nitride film (SN1-2). The 1-1 silicon nitride film (SN1-1) and the 1-2 silicon nitride film (SN1-2) have different thicknesses from each other. By forming the silicon nitride films with different thicknesses, regions having differential voltages are generated.

Figure 7:
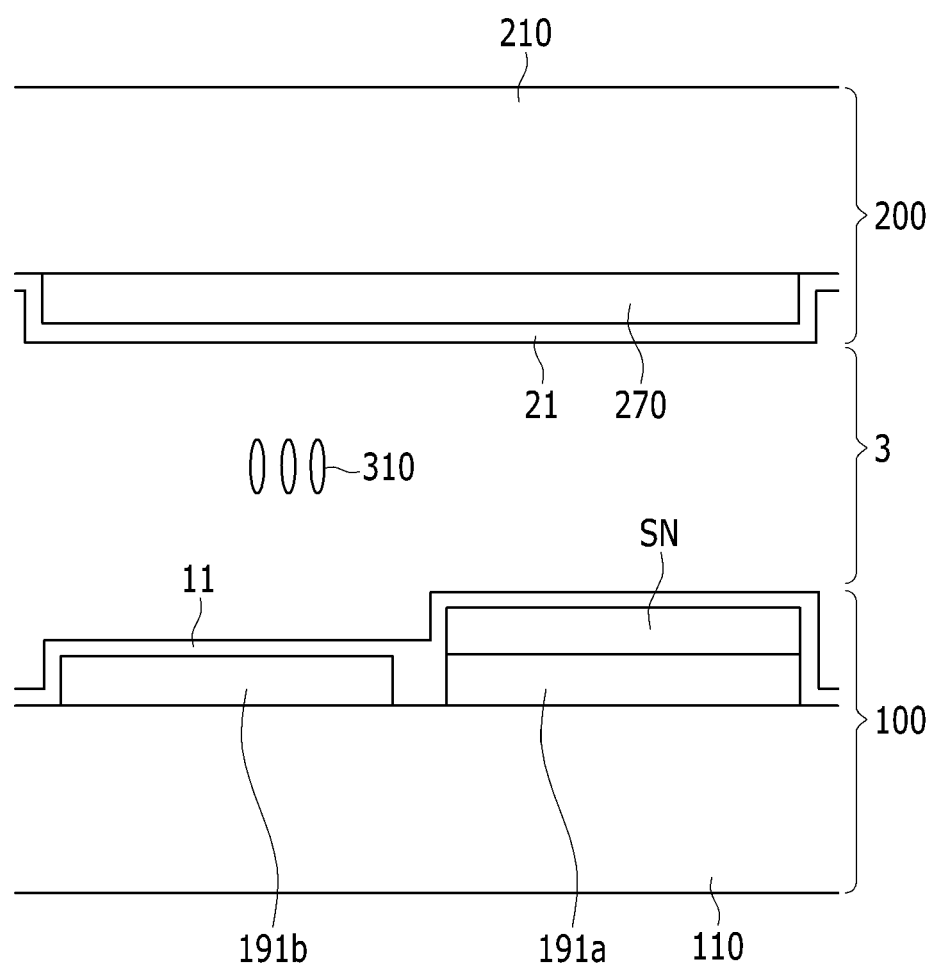
FIG. 7 shows a cross-sectional view of a liquid crystal display according to an embodiment.

FIG. 7 shows a cross-sectional view of a liquid crystal display, according to an embodiment. The exemplary embodiment of FIG. 7 differs from that of FIG. 2 at least in that the third region P3 is not formed. That is, the area is divided into only two regions, a first region P1 and a second region P2, to generate a differential voltage. Referring to FIG. 7, a silicon nitride film (SN) is disposed on the first subpixel electrode 191*a*, and the first alignment layer 11 is disposed directly on the second subpixel electrode 191*b*.

Figure 8:
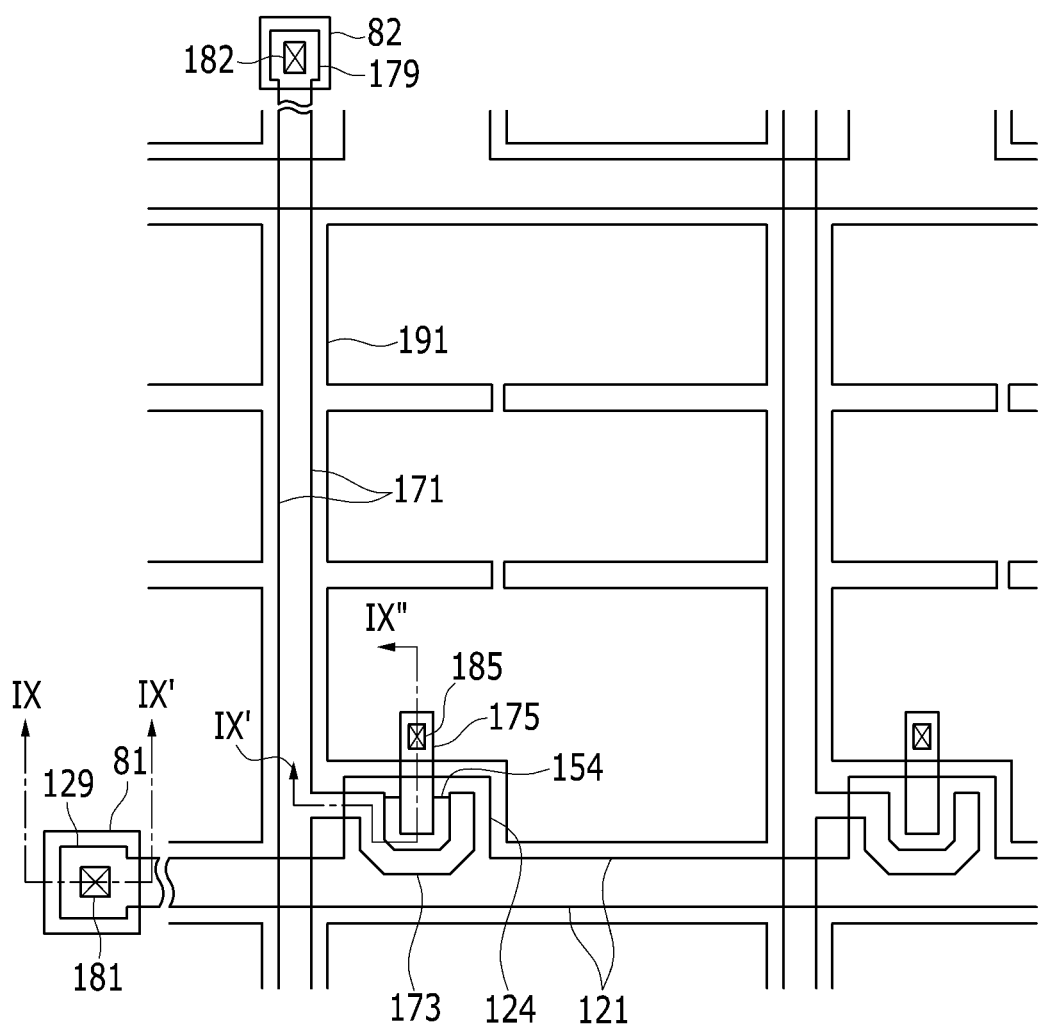
FIG. 8 shows a top plan view of a liquid crystal display according to an embodiment.
Figure 9:
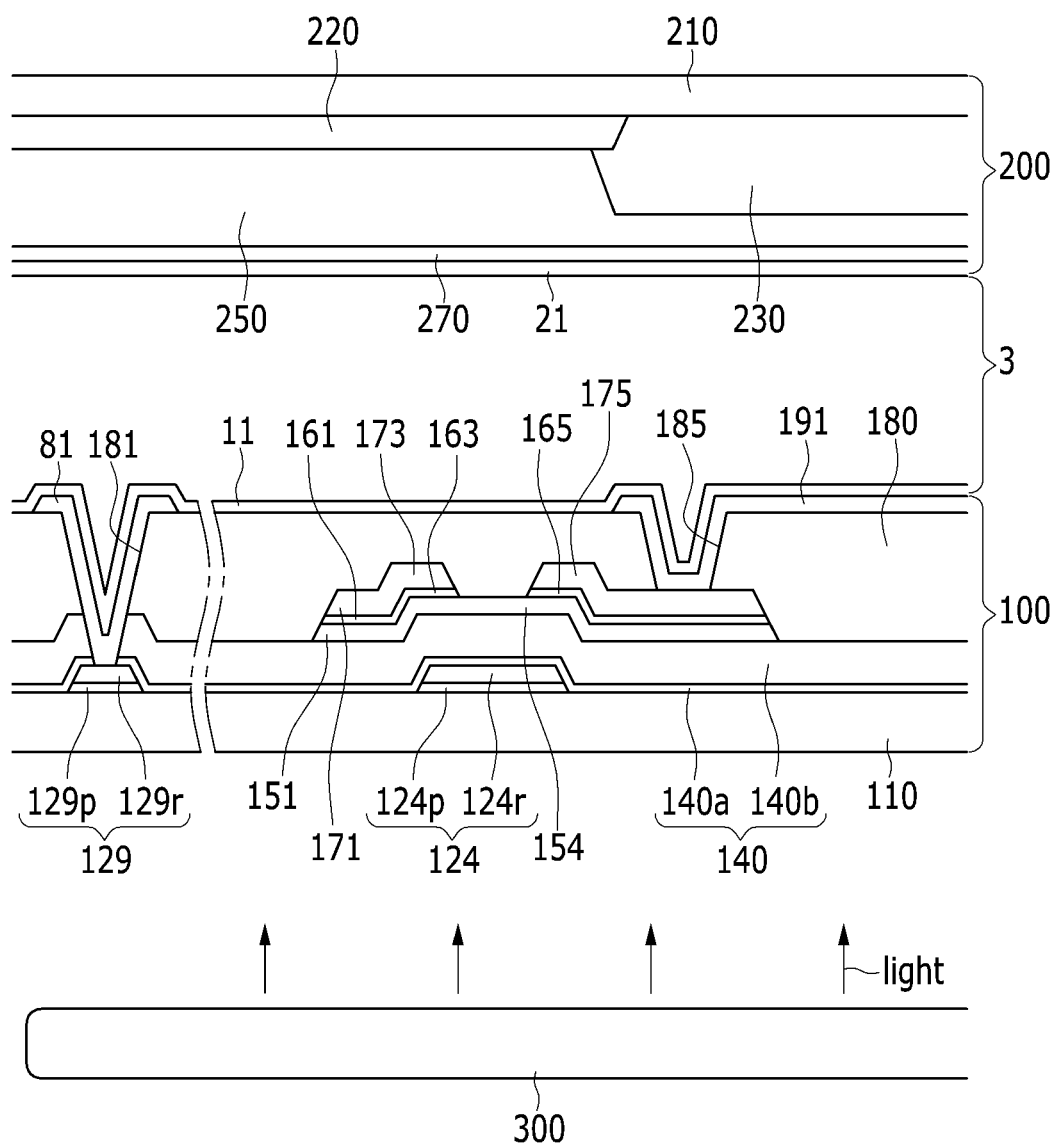
FIG. 9 shows a cross-sectional view of a liquid crystal display with respect to lines IX-IX' and IX'-IX" of FIG. 8.

The configuration of the exemplary embodiment described with reference to FIG. 1 and FIG. 2 is further described in reference to FIG. 8 and FIG. 9. FIG. 8 shows a top plan view of a liquid crystal display, according to an embodiment. FIG. 9 shows a cross-sectional view of a liquid crystal display with respect to lines IX-IX' and IX'-IX" of FIG. 8.

Referring to FIG. 8 and FIG. 9, the liquid crystal display includes a lower panel 100, an upper panel 200, and a liquid crystal layer 3 disposed between the display panels 100 and 200. A backlight unit 300 is disposed at a position that faces the lower panel 100. The position of the backlight unit 300, however, is not limited to facing the lower panel 100 and may be disposed at a position that faces the upper panel 200.

The lower panel 100 is described hereinafter. A plurality of gate lines 121 are formed on the insulation substrate 110, which may be made of a material such as transparent glass or plastic. A gate line 121 transfers a gate signal and extends mainly in a horizontal direction. Each gate line 121 includes a plurality of gate electrodes 124 protruding from the gate line 121 and a wide end portion 129 configured to be connected with another layer or a gate driver (not illustrated). The end portion 129 of the gate line may be formed with a lower layer 129*p* and an upper layer 129*r*.

The gate line 121 and the gate electrode 124 have a dual-layer structure including lower layers 121*p* and 124*p* and upper layers 121*r* and 124*r*. The lower layers 121*p* and 124*p* may be formed with, for example, one of titanium, tantalum, molybdenum, or an alloy thereof. The upper layers 121*r* and 124*r* may be formed with, for example, copper (Cu) or a copper alloy. Although the gate line 121 and the gate electrode 124 are described above as having a dual-layer structure in the exemplary embodiment of FIG. 9, the gate line 121 and the gate electrode 124 may be formed with a single-layer structure.

A gate insulating layer 140 made of an insulating material, such as silicon nitride, is formed on the gate line 121. The gate insulating layer 140 includes a lower gate insulating layer 140*a* and an upper gate insulating layer 140*b*, which may be formed with an insulating material such as silicon nitride or silicon oxide. In another embodiment, the gate insulating layer 140 may be formed as a single layer.

A semiconductor layer 151 made of, for example, hydrogenated amorphous silicon or polysilicon is formed on the gate insulating layer 140. The semiconductor layer 151 extends mainly in a longitudinal direction and includes a plurality of projections 154 that extend to the gate electrode 124.

A plurality of ohmic contact stripes 161 and ohmic contact islands 165 are formed on the projections 154 of the semiconductor layer 151. An ohmic contact stripe 161 includes a plurality of projections 163. A projection 163 and an ohmic contact island 165 form a pair and are disposed on the projection 154 of the semiconductor layer 151.

A plurality of data lines 171, a plurality of source electrodes 173 connected to the data lines 171, and a plurality of drain electrodes 175 facing the source electrodes 173 are formed on the ohmic contacts 161 and 165 and the gate insulating layer 140.

A data line 171 transmits a data signal and extends mainly in the longitudinal direction and crosses the gate line 121. The source electrode 173 may extend toward the gate electrode 124 and have a U shape or various other shape.

As FIG. 8 shows, the drain electrode 175 is separated from the data line 171 and extends upward from the middle of the U-shaped source electrode 173. The data line 171 includes a wide end portion 179 configured to connect to another layer or a data driver (not shown).

Although not shown, the data line 171, the source electrode 173, and the drain electrode 175 may have a dual-layer structure including an upper layer and a lower layer. The upper layer may be formed of, for example, copper (Cu) or a copper alloy, and the lower layer may be formed of, for example, one of titanium (Ti), tantalum (Ta), molybdenum (Mo), and alloys thereof. The data line 171, the source electrode 173, and the drain electrode 175 may have a tapered lateral side.

The ohmic contacts 161, 163, and 165 are formed directly on the semiconductors 151 and 154 and below the data line 171 and the drain electrode 175.

That is, the ohmic contacts 161, 163, and 165 are formed between the semiconductors 151 and 154 and the data line 171 and the drain electrode 175, thereby reducing the contact resistance between them. The ohmic contacts 161, 163, and 165 may have substantially the same planar pattern as the data line 171, the source electrode 173, and the drain electrode 175.

On the projection 154 of the semiconductor layer 151, there is an exposed portion that is not covered by the data line 171 and the drain electrode 175 as well as a portion that overlaps with the source electrode 173 and the drain electrode 175. The semiconductor layer 151 may have substantially the same planar pattern as the ohmic contacts 161 and 165 except at the exposed portion of the projection 154.

A gate electrode 124, a source electrode 173, and a drain electrode 175 form a thin-film transistor (TFT) together with the projection 154 of the semiconductor layer 151. A channel of the thin-film transistor is formed on the projection 154 between the source electrode 173 and the drain electrode 175.

A passivation layer 180 is formed on the data line 171, the drain electrode 175, and the projection 154 of the exposed semiconductor layer. The passivation layer 180 may made of an inorganic insulator, an organic insulator, or a low-dielectric insulator such as a silicon nitride or silicon oxide.

A contact hole 181 that exposes an end portion 129 of the gate line 121 is formed on the passivation layer 180 and the gate insulating layer 140. Also, a contact hole 182 that exposes the end portion 179 of the data line 171 and a contact hole 185 that expose an end of the drain electrode 175 are formed on the passivation layer 180.

A pixel electrode 191 and contact assistants 81 and 82 are formed on the passivation layer 180 and may be made of a transparent conductive material such as ITO or IZO, or a reflective metal such as aluminum, silver, chromium, or an alloy thereof. The pixel electrode 191 is electrically connected to the drain electrode 175 through the contact hole 185 and receives a data voltage from the drain electrode 175.

The contact assistants 81 and 82 are connected through the contact holes 181 and 182 to the gate pad 129 of the gate line 121 and the data pad 179 of the data line 171, respectively. The contact assistants 81 and 82 facilitate adherence of the end portion 129 of the gate line 121 and the end portion of the data line 171 to an external device, as well as protect the end portions.

A first alignment layer 11 is disposed on the pixel electrode 191.

The upper panel 200 is described hereinafter. A light blocking member 220 is formed on the insulation substrate 210 made of, for example, transparent glass or plastic. The light blocking member 220 prevents light leakage between the pixel electrodes 191 and defines an opening region that faces the pixel electrode 191.

A plurality of color filters 230 are formed on the insulation substrate 210 and the light blocking member 220. The color filters 230 are disposed mostly within the area surrounded by the light blocking member 220 and may extend along the columns of the pixel electrodes 191 in the longitudinal direction. The respective color filters 230 may display one of three primary colors including red, green, and blue. Although the light blocking member 220 and the color filter 230 are described above as being formed on the upper panel 100 in the exemplary embodiment of FIG. 9, the light blocking member 200 or the color filter 230 may be formed on the lower panel 200.

An overcoat 250 is formed on the color filter 230 and the light blocking member 220. The overcoat 250 may be made of an inorganic or organic insulator. The overcoat prevents the color filters 230 from being exposed and provides a planarized surface. In some cases, the overcoat 250 may be omitted.

As FIG. 9 illustrates, a common electrode 270 is formed on a lower surface of the overcoat 250. The common electrode 270 may be made of a transparent conductor such as ITO or IZO, and receives a common voltage Vcom. A second alignment layer 21 is formed on a lower surface of the common electrode 270.

The liquid crystal layer 3 is interposed between the thin-film transistor array panel 100 and the upper display panel 200 and includes liquid crystal molecules having negative dielectric anisotropy. That is, in the absence of an electric field, the liquid crystal molecules are aligned such that their long axes are perpendicular to the surfaces of the two display panels 100 and 200.

The pixel electrode 191 and the common electrode 270 form a liquid crystal capacitor together with a portion of the liquid crystal layer 3 therebetween. The liquid crystal capacitor is capable of maintaining the applied voltage even after the thin-film transistor is turned off. Moreover, the pixel electrode 191 may overlap with a storage electrode line (not illustrated) to form a storage capacitor and, thereby, increase the voltage storage capacity of the liquid crystal capacitor.

Although not explicitly shown in FIG. 8 and FIG. 9, the manner in which the silicon nitride films SN1 and SN2 and the differential voltage are formed in FIG. 2 may be applied to the exemplary embodiment of FIGS. 8 and 9.

While the present disclosure describes a number of exemplary embodiments, it is not limited to the disclosed embodiments. Instead, the present disclosure is intended to cover various modifications and equivalent arrangements that those of ordinary skill in the art would understand from the present disclosure.

What is claimed is:

1. A liquid crystal display comprising:
a first substrate;
a first electrode disposed on the first substrate;
a second substrate facing the first substrate;
a second electrode disposed on the second substrate and facing the first electrode;
a liquid crystal layer disposed between the first substrate and the second substrate; and
a first silicon nitride film disposed between the liquid crystal layer and at least one of the first electrode and the second electrode,
wherein a first region in which the first silicon nitride film is disposed between either of the first electrode and the second electrode and the liquid crystal layer is formed, and a second region in which the first silicon nitride film is not disposed between the first electrode and the liquid crystal layer and between the second electrode and the liquid crystal layer is formed,
wherein the first silicon nitride film in the first region comprises a third silicon nitride film and a fourth silicon nitride film, the third silicon nitride film and the fourth silicon nitride film having different thicknesses from each other, and
wherein a first electric field generated between the first and second electrodes in the first region is different from a second electric field generated between the first and second electrodes in the second region.

2. The liquid crystal display of claim 1, wherein the first region and the second region are included in a pixel.

3. The liquid crystal display of claim 2, wherein the first silicon nitride film includes positive charges.

4. The liquid crystal display of claim 3, wherein the first silicon nitride film includes positive charges expressed in the following Formula 1:

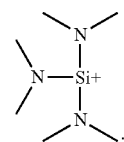

Formula 1

5. The liquid crystal display of claim 4, further comprising a thin-film transistor disposed on the first substrate,
wherein the thin-film transistor is connected to the first electrode,
the first electrode includes a first subpixel electrode corresponding to the first region and a second subpixel electrode corresponding to the second region, and
the first subpixel electrode and the second subpixel electrode receive a voltage from the thin-film transistor.

6. The liquid crystal display of claim 5, further comprising an alignment layer disposed between the first silicon nitride film and the liquid crystal layer in the first region, and disposed between at least one of the first electrode and the second electrode and the liquid crystal layer in the second region.

7. A liquid crystal display comprising:
a first substrate;
a first electrode disposed on the first substrate;
a second substrate facing the first substrate;
a second electrode disposed on the second substrate and facing the first electrode; a liquid crystal layer disposed between the first substrate and the second substrate; and
a first silicon nitride film disposed between the liquid crystal layer and at least one of the first electrode and the second electrode,
wherein a first region in which the first silicon nitride film is disposed between either the first electrode and the second electrode and the liquid crystal layer is formed, and a second region in which the first silicon nitride film is not disposed between the first electrode and the liquid crystal layer and between the second electrode and the liquid crystal layer is formed,
wherein a first electric field generated between the first and second electrodes in the first region is different from a second electric field generated between the first and second electrodes in the second region, wherein the first silicon nitride film is disposed between the first electrode and the liquid crystal layer, and a second silicon nitride film is disposed in a third region of the liquid crystal display and between the second electrode and the liquid crystal layer.

8. The liquid crystal display of claim 7, wherein the second region is disposed between the first region and the third region.

9. The liquid crystal display of claim 8, wherein the first region, the second region, and the third region are included in a pixel.

10. The liquid crystal display of claim 9, wherein the first and second silicon nitride films include positive charges expressed in the following Formula 1:

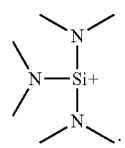

Formula 1

11. The liquid crystal display of claim 10, further comprising a thin-film transistor disposed on the first substrate, wherein the thin-film transistor is connected to the first electrode, the first electrode includes a first subpixel electrode corresponding to the first region, a second subpixel electrode corresponding to the second region, and a third subpixel electrode corresponding to the third region, and the first subpixel electrode, the second subpixel electrode, and the third subpixel electrode receive a voltage from the thin-film transistor.

12. The liquid crystal display of claim 11, further comprising an alignment layer disposed between the first silicon nitride film and the liquid crystal layer in the first region, disposed between the second silicon nitride film and the liquid crystal layer in the third region, and disposed between at least one of the first electrode and the second electrode and the liquid crystal layer in the second region.

13. A method for manufacturing a liquid crystal display comprising:
    forming a first electrode on a first substrate;
    forming a second electrode on a second substrate facing the first substrate;
    forming a first silicon nitride film on at least one of the first electrode and the second electrode; and
    forming a liquid crystal layer between the first substrate and the second substrate,
    wherein a first region in which the first silicon nitride film is disposed between either of the first electrode and the second electrode and the liquid crystal layer is formed,
    and a second region in which the first silicon nitride film is not disposed between the first electrode and the liquid crystal layer and between the second electrode and the liquid crystal layer is formed, and
    wherein a first electric field generated between the first and second electrodes in the first region is different from a second electric field generated between the first and second electrodes in the second region, and
    wherein the first silicon nitride film is formed between the first electrode and the liquid crystal layer, and a second silicon nitride film is formed in a third region of the liquid crystal display and between the second electrode and the liquid crystal layer.

14. The method of claim 13, wherein the first silicon nitride film is formed at the temperature equal to or less than 450 degrees Celsius by using a chemical vapor deposition method.

15. The method of claim 14, wherein the silicon nitride film is formed to include positive charges.

16. The method of claim 15, wherein the silicon nitride film is formed to include positive charges expressed in the following Formula 1:

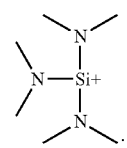

Formula 1

17. The method of claim 16, further comprising forming an alignment layer between the first silicon nitride film and the liquid crystal layer in the first region and between at least one of the first electrode and the second electrode and the liquid crystal layer in the second region.

18. The method of claim 13, wherein
    the second region is formed between the first region and the third region.

19. The method of claim 13, wherein the first region, the second region, and the third region are formed to be included in a pixel.

20. The method of claim 19, further comprising forming a thin-film transistor on the first substrate, wherein the thin-film transistor is connected to the first electrode, the first electrode includes a first subpixel electrode corresponding to the first region, a second subpixel electrode corresponding to the second region, and a third subpixel electrode corresponding to the third region, and the first subpixel electrode, the second subpixel electrode, and the third subpixel electrode receive a voltage from the thin-film transistor.

* * * * *